(12) United States Patent
Jiao et al.

(10) Patent No.: US 12,152,944 B2
(45) Date of Patent: Nov. 26, 2024

(54) SELF-ENERGY TYPE THERMAL RESPONSE MONITORING DEVICE

(71) Applicant: ZHEJIANG UNIVERSITY, Zhejiang (CN)

(72) Inventors: Pengcheng Jiao, Zhejiang (CN); Bozhi Hou, Zhejiang (CN); Jie Yang, Zhejiang (CN); Yang Yang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 452 days.

(21) Appl. No.: 17/622,248

(22) PCT Filed: Apr. 25, 2021

(86) PCT No.: PCT/CN2021/089506
§ 371 (c)(1),
(2) Date: Dec. 23, 2021

(87) PCT Pub. No.: WO2021/227840
PCT Pub. Date: Nov. 18, 2021

(65) Prior Publication Data
US 2022/0349759 A1    Nov. 3, 2022

(30) Foreign Application Priority Data

May 11, 2020    (CN) .......................... 202010394235.9

(51) Int. Cl.
    *H02N 2/18*     (2006.01)
    *G01B 7/16*     (2006.01)
    *G01K 5/58*     (2006.01)

(52) U.S. Cl.
    CPC ................. *G01K 5/58* (2013.01); *G01B 7/16* (2013.01); *H02N 2/18* (2013.01); *H02N 2/186* (2013.01)

(58) Field of Classification Search
CPC ............ G01K 5/58; H02N 2/18; H02N 2/186; G01G 11/00
See application file for complete search history.

(56) References Cited

U.S. PATENT DOCUMENTS 4,218,620 A * 8/1980 Oettel ................... G01K 7/003
    250/338.3
7,839,058 B1 * 11/2010 Churchill ............. H10N 30/304
    310/332

(Continued)

FOREIGN PATENT DOCUMENTS

| CN | 1471623 A | * | 1/2004 | ........... G01N 17/006 |
| CN | 101002343 A | * | 7/2007 | ........... B60C 23/041 |

(Continued)

OTHER PUBLICATIONS

17622248_2024-05-14_CN_108028613_A_H.pdf,May 11, 2018.*

(Continued)

*Primary Examiner* — Gail Kaplan Verbitsky
(74) *Attorney, Agent, or Firm* — JCIP GLOBAL INC.

(57) ABSTRACT

A self-energy type thermal response monitoring device includes a periphery constraint assembly, a variable-frequency beam arranged in the periphery constraint assembly, piezoelectric patches covering the variable-frequency beam, and an electric signal collector electrically connected to the piezoelectric patches. Deformation of the variable-frequency beam is limited by innovatively using rigid constraint, and a low-frequency thermal load is converted into a high-frequency post-buckling impact to trigger a piezoelectric material to generate an electric signal.

5 Claims, 5 Drawing Sheets

(56) References Cited

U.S. PATENT DOCUMENTS

| | | | |
|---|---|---|---|
| 8,232,858 B1 | 7/2012 | Garcia et al. | |
| 8,901,802 B1* | 12/2014 | Que | H02N 2/186 310/330 |
| 2006/0265175 A1* | 11/2006 | Shimohamadi | G01K 13/00 374/E1.023 |
| 2008/0136292 A1* | 6/2008 | Thiesen | H10N 30/03 29/25.35 |
| 2010/0072759 A1* | 3/2010 | Andosca | H02N 2/188 290/1 R |
| 2011/0101827 A1* | 5/2011 | Yoon | H02N 2/186 310/339 |
| 2012/0326536 A1* | 12/2012 | Nair | H02N 2/188 310/26 |
| 2015/0349667 A1* | 12/2015 | Andosca | H02N 2/188 310/319 |
| 2022/0123715 A1* | 4/2022 | Martin | H03H 3/04 |

FOREIGN PATENT DOCUMENTS

| | | | |
|---|---|---|---|
| CN | 101262189 A | * | 9/2008 |
| CN | 201656813 U | * | 11/2010 |
| CN | 102882420 | | 1/2013 |
| CN | 106936334 | | 7/2017 |
| CN | 108028613 | | 5/2018 |
| CN | 108028613 A | * | 5/2018 ........ H01L 41/1134 |
| CN | 108645529 | | 10/2018 |
| CN | 109791975 | | 5/2019 |
| CN | 109922192 A | * | 6/2019 |
| CN | 209516971 U | * | 10/2019 |
| CN | 111551271 | | 8/2020 |
| CN | 118447682 A | * | 8/2024 |
| JP | 2017200259 A | * | 11/2017 |
| KR | 20100121031 A | * | 11/2010 |
| KR | 20150049109 A | * | 5/2015 |
| WO | WO2006009329 A1 | * | 5/2008 |
| WO | 2009039293 | | 3/2009 |
| WO | 2016137096 | | 9/2016 |

OTHER PUBLICATIONS

17622248_2024-05-14_CN_201656813_U_H.pdf,Nov. 24, 2010.*
17622248_2024-05-14_JP_2017200259_A_H.pdf,Nov. 2, 2017.*
17622248_2024-05-14_JP_WO2006009329_A1_H.pdf,May 1, 2008.*
17622248_2024-05-14_KR_20100121031_A_H.pdf,Nov. 17, 2010.*
17622248_2024-05-14_KR_20150049109_A_H.pdf,May 8, 2015.*
17622248_2024-05-14_CN_101262189_A_H.pdf,Sep. 10, 2008.*
17622248_2024-08-27_CN_118447682_A_H.pdf,Aug. 6, 2024.*
17622248_2024-08-27_CN_1471623_A_H.pdf,Jan. 28, 2004.*
17622248_2024-08-27_CN_111551269_A_H.pdf,Aug. 18, 2020.*
17622248_2024-08-27_CN_209516971_U_H.pdf,Oct. 18, 2019.*
17622248_2024-08-27_CN_112600460_A_H.pdf,Apr. 2, 2021.*
"International Search Report (Form PCT/ISA/210)" of PCT/CN2021/089506, with English translation thereof, mailed on Jul. 27, 2021, pp. 1-6.
"Written Opinion of the International Searching Authority (Form PCT/ISA/237)" of PCT/CN2021/089506, mailed on Jul. 27, 2021, pp. 1-5.

* cited by examiner

SELF-ENERGY TYPE THERMAL RESPONSE MONITORING DEVICE

CROSS-REFERENCE TO RELATED APPLICATION

This application is a 371 of international application of PCT application serial no. PCT/CN2021/089506, filed on Apr. 25, 2021, which claims the priority benefit of China application no. 202010394235.9, filed on May 11, 2020. The entirety of each of the above mentioned patent applications is hereby incorporated by reference herein and made a part of this specification.

TECHNICAL FIELD

The present invention belongs to the field of structural health monitoring and energy collection, and in particular relates to a self-energy type thermal response monitoring device.

DESCRIPTION OF RELATED ART

Thermal loads caused by temperature fluctuation have a significant influence on the stability and durability of infrastructure, such as thermal expansion and contraction cycles caused by diurnal or seasonal temperature changes. Thus, the thermal load is defined as one of the important limit states for structural load bearing. To relieve the influence of these thermal loads, structural elements in the civil infrastructure are designed to generally take thermal expansion and contraction into consideration. Adequate consideration of the thermal effects of concrete structures requires measurement of temperature changes of structural components thereof. However, if there is no effective thermal detection, the influence of the temperature fluctuation to the response of the concrete structures cannot be accurately predicted. Moreover, the temperature changes in the structures may cause change of modal parameters, especially the change of modal frequencies, thus a specific multi-variable signal processing technology is required.

Buckling effect has been studied to employ its elastic instability to achieve different functional requirements. The advantages thereof are that the thermal response of the concrete building under continuous temperature change can be effectively and accurately sensed, the temperature change of the surrounding environment of the structure can be monitored, and early warning can be given in advance to facilitate technical personnel to take preventive measures to relieve the influence of the thermal load on the structure. At present, a buckling element has been developed and applied to monostable, bistable, and multi-stable mechanisms for sensing, driving, and energy harvesting. A self-energy type thermal response monitoring device provided by the present disclosure is based on a buckling-based damage sensing mechanism, with a main body comprising a variable-frequency beam, and a piezoelectric patch connected to the beam. Under strain or deformation, the beam bends and snaps in to trigger a piezoelectric conductor, thereby generating an electric signal.

At present, most of the thermal sensors need to be provided with batteries or to be connected to an external power supply, thus there is a thermal monitoring gap when the battery is replaced or the power is unexpectedly cut. The research shows that the variable-frequency beam deforms through environment thermal energy, and then the piezoelectric patch is triggered through the buckling effect of the variable-frequency beam, thus achieving energy conversion from environment thermal energy to mechanical energy to electric energy. Therefore, once the environment thermal energy exceeding a threshold value occurs, the technical equipment can independently generate the electric energy to complete monitoring work, and can also supply energy to other electric equipment.

Compared with an existing structural health monitoring technology, the thermal response monitoring equipment provided by the present invention can achieve electric energy self-supply, and can also supply electric energy to other external equipment at the same time; an electric signal of a sensor based on the buckling effect is directly triggered by deformation caused by thermal load, thus the thermal response of the concrete building under continuous temperature change can be sensed more accurately, and the temperature change of the surrounding environment of the structure can be monitored; and the proposed measuring device design is used for generating an electrical signal caused by specific displacement, thus greatly reducing the amount of monitored data.

SUMMARY

To make up disadvantages of the prior art, the utility model provides a technical solution of a self-energy type thermal response monitoring device.

The self-energy type thermal response monitoring device comprises a periphery constraint assembly, a variable-frequency beam arranged in the periphery constraint assembly, piezoelectric patches covering the variable-frequency beam, and an electric signal collector electrically connected to the piezoelectric patches.

In accordance with the self-energy type thermal response monitoring device, the periphery constraint assembly comprises a lower support, side constraint parts fixedly connected to two sides of the lower support, and an upper support movably arranged at upper ends of the two side constraint parts. The variable-frequency beam is located in an accommodating space enclosed by the upper support, the lower support, and the side constraint parts; and an upper end and a lower end of the variable-frequency beam are fixedly connected to the upper support and the lower support respectively.

In accordance with the self-energy type thermal response monitoring device, gaps are existent between the variable-frequency beam and the side constraint parts, and the variable-frequency beam is closer to one of the side constraint parts than the other side constraint part.

In accordance with the self-energy type thermal response monitoring device, two piezoelectric patches are provided, which respectively covers two sides, corresponding to the side constraint parts, of the variable-frequency beam. The two piezoelectric patches are respectively connected to the electric signal collector through wires.

In accordance with the self-energy type thermal response monitoring device, the upper support, the side constraint parts and the lower support are all made of a rigid material, the variable-frequency beam is an elongate flexible beam, and the variable-frequency beam can generate a post-buckling phenomenon to make the piezoelectric patches arranged at the two sides of the variable-frequency beam contact the side constraint parts.

In accordance with the self-energy type thermal response monitoring device, the piezoelectric patches are each made of a piezoelectric material, the piezoelectric patches generate electric signals under pressure, and the electric signals are transmitted to the external electric signal collector through the wires.

Compared with the prior art, the present disclosure has the following beneficial effects.

According to the present invention, deformation of the variable-frequency beam is limited by innovatively using rigid constraint, and a low-frequency thermal load is converted into a high-frequency post-buckling impact to trigger a piezoelectric material to generate an electric signal. A mode of triggering the electric signal by specific displacement is innovatively used. Characteristics of the variable-frequency beam and the piezoelectric material are innovatively combined and utilized to achieve energy conversion from environmental thermal energy to mechanical energy to electric energy, and therefore thermal response monitoring equipment provided by the present invention can achieve electric energy self-supply and can also supply electric energy to other external equipment at the same time. The buckling mode conversion of a measuring device is effectively controlled by innovatively changing geometric features of the device, thus controlling a trigger condition of the electric signal. The electric signal is innovatively directly triggered by temperature deformation, thus monitoring temperature change of the surrounding environment of the structure.

DESCRIPTION OF THE EMBODIMENTS

Figure 1:
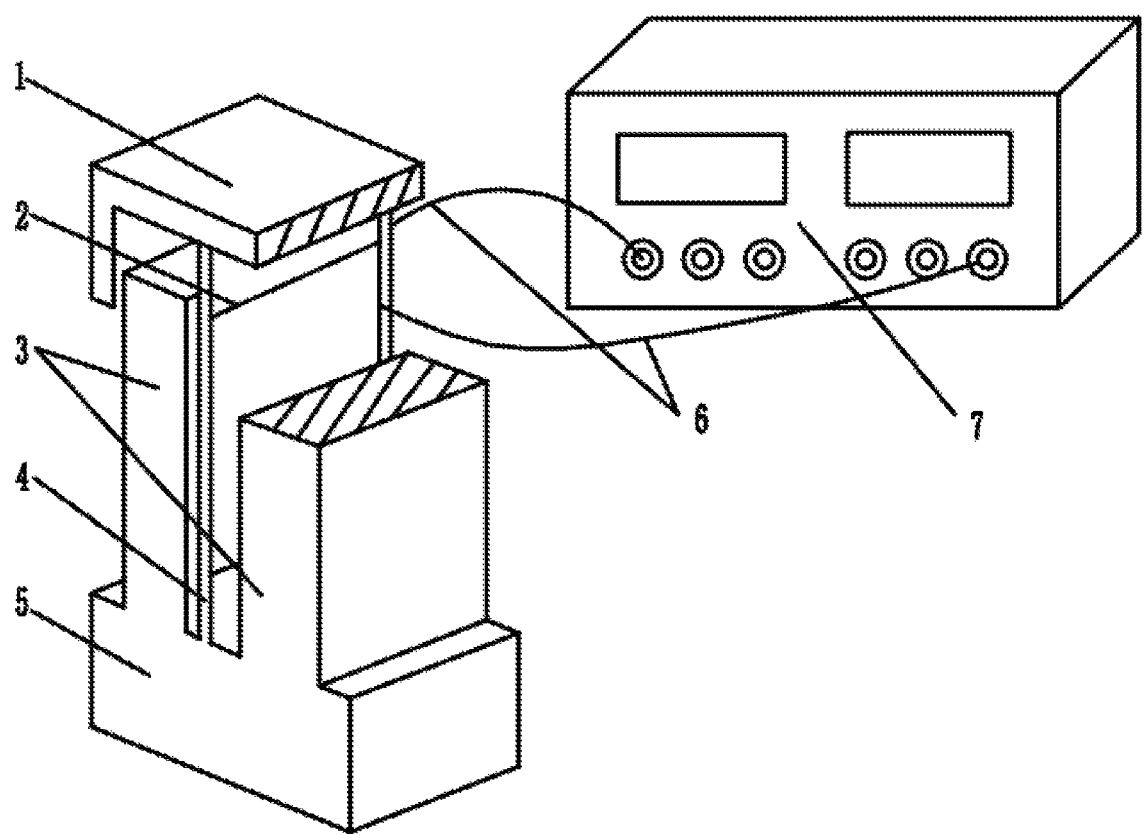
FIG. 1 is a diagram of the structure of the present invention.

As shown in the figure, a self-energy type thermal response monitoring device comprises a periphery constraint assembly, a variable-frequency beam 4 arranged in the periphery constraint assembly, piezoelectric patches 2 covering the variable-frequency beam 4, and an electric signal collector 7 electrically connected to the piezoelectric patches 2.

As an optimized structure of the present invention, the periphery constraint assembly comprises a lower support 5, side constraint parts 3 fixedly connected to two sides of the lower support 5, and an upper support 1 movably arranged at upper ends of the two side constraint parts 3. The variable-frequency beam 4 is located in an accommodating space enclosed by the upper support 1, the lower support 5, and the side constraint parts 3. An upper end and a lower end of the variable-frequency beam 4 are fixedly connected to the upper support 1 and the lower support 5 respectively. The side constraint parts 3 are not in contact with the upper support 1, and the upper support 1 is supported on an upper end of the variable-frequency beam 4.

As an optimized structure of the present invention, gaps are existent between the variable-frequency beam 4 and the side constraint parts 3, and the variable-frequency beam 4 is closer to one of the side constraint parts 3 than the other side constraint part 3.

As an optimized structure of the present invention, two piezoelectric patches 2 are provided, which respectively covers two sides, corresponding to the side constraint parts 3, of the variable-frequency beam 4. The two piezoelectric patches 2 are respectively connected to the electric signal collector 7 through wires 6.

As an optimized structure of the present invention, the upper support 1, the side constraint parts 3 and the lower support 5 are all made of a rigid material, the variable-frequency beam 4 is an elongate flexible beam, and the variable-frequency beam 4 can generate a post-buckling phenomenon to make the piezoelectric patches 2 arranged at the two sides of the variable-frequency beam 4 contact the side constraint parts 3.

As an optimized structure of the present invention, the piezoelectric patches 2 are each made of a piezoelectric material, and then the piezoelectric patches 2 generate electric signals under pressure, and the electric signals are transmitted to the external electric signal collector 7 through the wires 6.

The working process of the self-energy thermal response monitoring technology is explained with FIG. 1 as an example. For example, the periphery constraint assembly and the variable-frequency beam 4 at the left side of FIG. 1 are arranged in a concrete structure, electric signals generated by the piezoelectric patches 2 under extrusion are transmitted to an external equipment electric signal collector 7 through the wires 6. The piezoelectric patches 2 can continuously generate electric energy under continuous extrusion, the electric signal collector 7 can work independently by using the electric energy to achieve energy self-supply, and meanwhile, the electric signal collector 7 can also supply electric energy to other external equipment.

Figure 2:
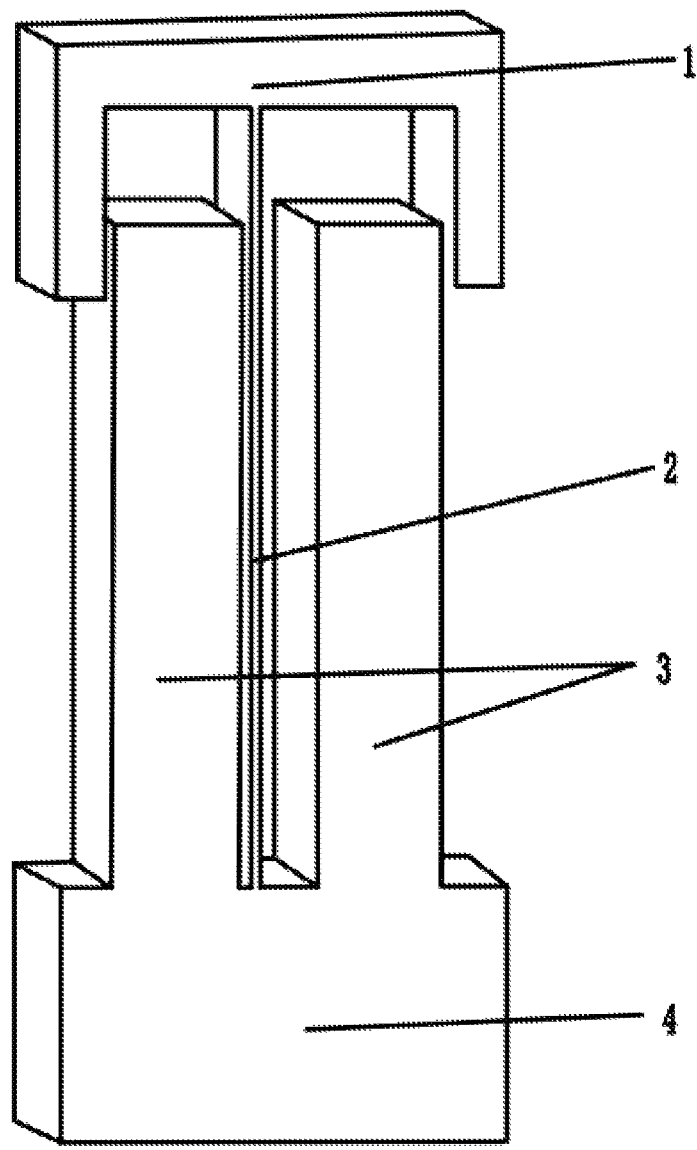
FIG. 2 is a first diagram of a connecting structure of a periphery constraint assembly and a variable-frequency beam of the present invention, wherein the variable-frequency beam is in an initial state.
Figure 3:
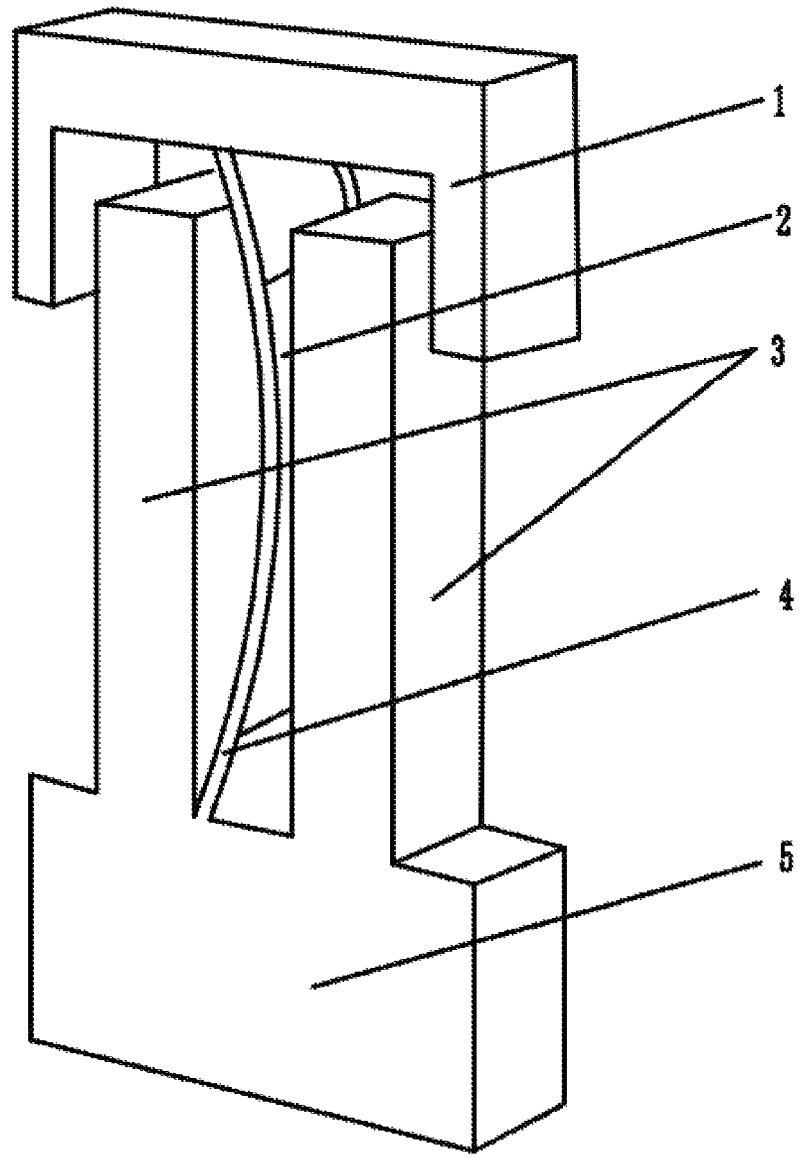
FIG. 3 is a diagram of a connecting structure of a periphery constraint assembly and a variable-frequency beam of the present invention, wherein the variable-frequency beam is in a first-order buckling mode.
Figure 4:
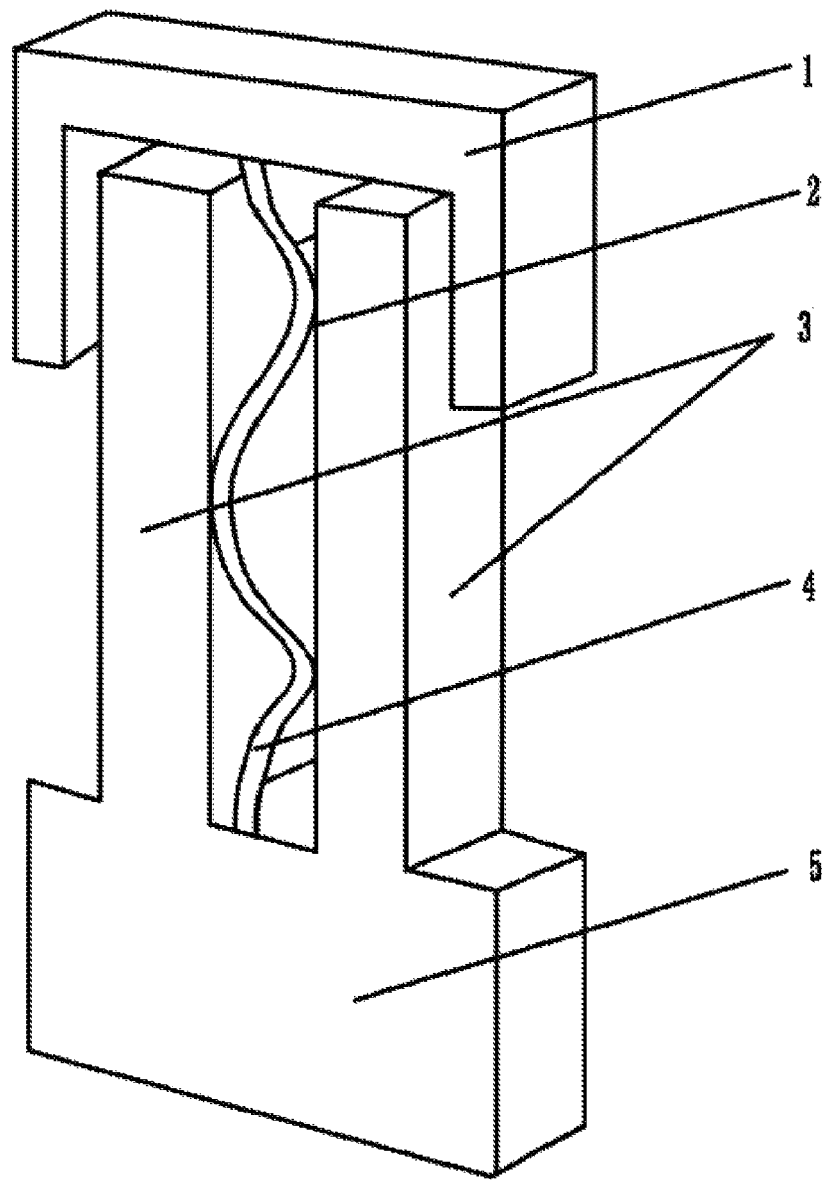
FIG. 4 is a diagram of a connecting structure of a periphery constraint assembly and a variable-frequency beam of the present invention, wherein the variable-frequency beam is in a third-order buckling mode.
Figure 5:
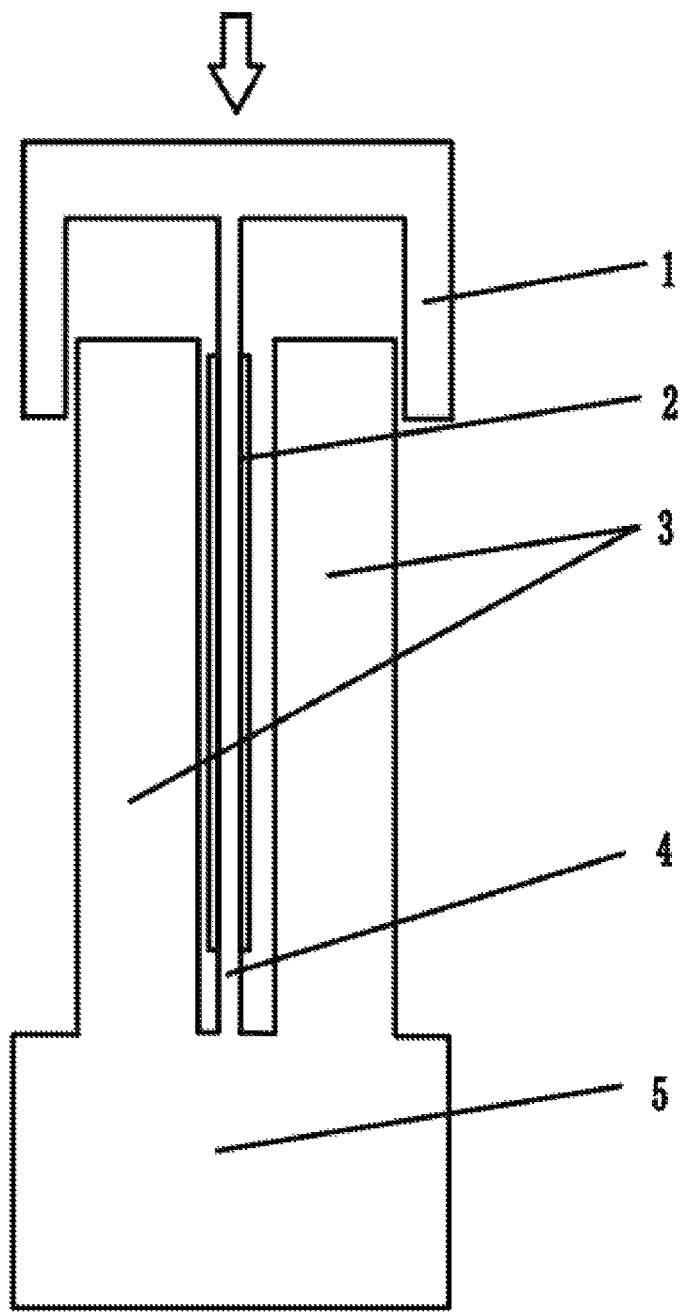
FIG. 5 is a second diagram of a connecting structure of a periphery constraint assembly and a variable-frequency beam of the present invention, wherein the variable-frequency beam is in an initial state.

The mechanical process of the self-energy thermal response monitoring technology is explained with FIG. 2, FIG. 3 and FIG. 4 as examples. For example, in the initial state of FIG. 2, under thermal-based displacement, the upper support 1 can move downwards, and the variable frequency beam 4 may gradually bend from a vertical state. The bending degree is increased as the thermal displacement increases, then the variable-frequency beam 4 reaches a first-order buckling mode in which the variable-frequency beam 4 has a curvelet, the variable-frequency beam 4 is to strike the side constraint part 3 at a right side at a high speed, and at the moment, the piezoelectric patch 2 is in contact with the side constraint part 3 at the right side, which is as shown in FIG. 3. Further, with continuous increase of the thermal displacement, the variable-frequency beam 4 reaches a third-order buckling mode in which the variable-frequency beam 4 has three curvelets, the variable-frequency beam 4 is to become into the situation in FIG. 4, and the piezoelectric patches 2 on the two sides of the variable-frequency beam 4 strike the side constraint parts 3 on the left side and the right side simultaneously. In this process, the variable-frequency beam 4 achieves the objective of converting low-frequency thermal load into high-frequency input, the piezoelectric patches 2 installed on the beam convert local high-frequency input into electric signals to indicate thermal-induced displacement. The equipment has no consideration of temperature compensation, thus the proposed measuring device design can only generate an electric signal caused by specific displacement.

It should be ultimately noted that various embodiments are merely used for describing the technical solutions of the present invention rather than limiting the same; while the present invention is described in detail with reference to the various embodiments, it should be understood by those of ordinary skill in the art that it is still possible to modify the technical solutions recorded in the foregoing embodiments, or to equivalently replace a part or all of the technical features thereof; and these modifications or replacements cannot make the essence of the corresponding technical scheme depart from the scope of the technical solutions of various embodiments of the present invention.

What is claimed is:

1. A self-energy type thermal response monitoring device, comprising a periphery constraint assembly, a variable-frequency beam arranged in the periphery constraint assembly, piezoelectric patches covering the variable-frequency beam, and an electric signal collector electrically connected to the piezoelectric patches,
wherein the upper support, the side constraint parts and the lower support are all made of a rigid material, the variable-frequency beam is an elongate flexible beam, and the variable-frequency beam is able to generate a post-buckling phenomenon to make the piezoelectric patches arranged at the two sides of the variable-frequency beam contact the side constraint parts.

2. The self-energy type thermal response monitoring device according to claim 1, wherein the periphery constraint assembly comprises a lower support, side constraint parts fixedly connected to two sides of the lower support, and an upper support movably arranged at upper ends of the two side constraint parts; the variable-frequency beam is located in an accommodating space enclosed by the upper support, the lower support, and the side constraint parts; and an upper end and a lower end of the variable-frequency beam are fixedly connected to the upper support and the lower support respectively.

3. The self-energy type thermal response monitoring device according to claim 2, wherein gaps are existent between the variable-frequency beam and the side constraint parts, and the variable-frequency beam is closer to one of the side constraint parts than the other one of the side constraint parts.

4. The self-energy type thermal response monitoring device according to claim 2, wherein the variable-frequency beam has two sides correspond to the side constraint parts, two piezoelectric patches respectively cover the two sides of the variable-frequency beam; and the two piezoelectric patches are respectively connected to the electric signal collector through wires.

5. The self-energy type thermal response monitoring device according to claim 4, wherein piezoelectric patches are each made of a piezoelectric material, the piezoelectric patches generate electric signals under pressure, and the electric signals are transmitted to the external electric signal collector through the wires.

* * * * *